United States Patent Office 3,108,880
Patented Oct. 29, 1963

3,108,880
PROCESS FOR RAPIDLY CURING COMMINUTED MEAT
Eugen Wierbicki, John R. Shackelford, and Glenn E. Cooper, Waterloo, Iowa, assignors to The Rath Packing Company, Waterloo, Iowa, a corporation of Iowa
No Drawing. Filed Mar. 31, 1958, Ser. No. 724,802
4 Claims. (Cl. 99—159)

This invention relates to an improved cured meat product and to the method for preparing such cured product. It finds particular application in preserving and improving the quality of comminuted cured meats such as dry sausage. Comminuted meats of this kind are normally admixed with salt, sodium nitrite, sodium nitrate and spices and subjected to a cure which is carried out for a considerable length of time before stuffing, for example, 24 to 36 hours at 34° to 40° F.

After being stuffed, the product is aged for varying lengths of time ranging from a few weeks to several months at 45° to 60° F. Some products are smoked after stuffing for 30 hours to a few days at 80° to 120° F. and then aged at 45° to 60° F. These treatments are applied to dry sausage products such as Genoa, salami, Farmer and similar dry sausages.

During these processes, the sodium nitrate curing agent is reduced to nitrite by muscle tissue of the meat and by certain salt tolerant harmless bacteria of many species. The nitrite formed and the sodium nitrite added, as such, in the slightly acid medium of meat (pH 5.4 to 6.0) is converted to nitrous acid, which, under reducing conditions, is transformed further to nitric oxide. Nitric oxide in turn unites with the meat pigment, myoglobin, to form nitric oxide myoglobin, which is known in the art as the "fixed color" of unheated cured meat. Nitric oxide myoglobin when heated to the temperature which coagulates proteins undergoes denaturation also, thus forming the red compound known as nitric oxide myochromogen.

After admixture of salt and curing agents to chopped dry sausage and the consequent curing for 24 to 36 hours at 34° to 40° F. before stuffing, the "fixed color" is partially formed in the meat chop, which turns gray or greenish-gray or grayish-brown in color on the surface. After remixing the chop and stuffing, this discoloration occurs on the surface of the sausage just under the casing. During the aging time, when the product is not previously smoked, this discoloration usually disappears under proper reducing and curing conditions, but not always. In some instances the surface discoloration turns more intense gray or green, presumably due to the disintegration of the originally formed nitric oxide myoglobin.

Smoking usually improves the cured meat color on the surface as well as inside the product. This is due to the formation of nitric oxide myochromogen, which, by its nature, is a more intense pink-red than the color of the non-smoked (unheated) nitric oxide myoglobin. However, we have found that heating the cured meats at a temperature from 80° to 120° F. for a few hours has little effect on the formation of a desirable pink or red color normally associated with the cured meat products, and an elevated heating temperature of 150° to 160° F. is required to get the desirable intensity of cured meat color.

The primary object of the present invention is to provide a process wherein the color in the meat is brought out at low temperatures, say less than 120° F. and as low as 30° to 50° F., in a relatively short period of time while forming the desirable cured meat color throughout the entire meat chop without surface discoloration either before or after stuffing of the meat. This invention is advantageous in the following aspects:

(1) It permits formation of the "fixed color" of unheated cured meats within 24 to 48 hours at 34° to 36° F. throughout the entire meat chop, including the surface area of meat.

(2) In the casing of cured sausage, it prevents the surface discoloration within the first few days after stuffing, when such meat products are not smoked or cooked.

(3) In the case of cured meat products which require smoking or heating at a maximum temperature of 80° to 120° F., it develops the intensity of the cured meat color comparable to the color of the cured meat product heat treated at 150° F. and above.

(4) In the case of uncooked cured meat products, commonly processed at low temperatures for a long period of time to provide the desired cured color intensity, this color intensity is formed within a much shorter time, thus decreasing the processing time.

(5) Also, in the case of uncooked cured meat products, it prevents the surface discoloration usually associated with such processing.

Another object of the invention is to provide an improved cured meat product which is enriched by the addition of minerals to improve the food value of the meat.

Another object of the invention is to provide a cured comminuted sausage product which is firm and has an improved structure.

We have found that these objectives may be attained by adding to the meat product to be cured calcium ions preferably in the form of a soluble edible calcium salt. The salt may be added per se or as calcium hydroxide plus an acid which forms the salt and maintains the pH below 6.0 where nitric oxide myoglobin will form. The calcium salt can be added in any convenient way, for example, with curing ingredients in dry form; by infusion into the vascular system of the animal; or as part of the cure-water suspension, when the addition of water is permitted in the meat product. Any method which provides uniform distribution of the calcium salt throughout the meat is satisfactory for purposes of the invention.

In order to obtain the improved cured meat product of the invention it is essential that the soluble edible calcium salt be added in a quantity in excess of 0.02 mole per kilogram of meat. Below 0.02 mole per kilogram the desirable improvements in quality are not significant. On the other hand, the upper limit on the quantity of calcium salt added is determined primarily by the taste of the cured meat product. Some salts have a more marked flavor than others, and, consequently, must be added in smaller quantities. As a general rule we have found that if the quantity of soluble calcium salt exceeds about 0.06 mole per kilogram, a slightly bitter taste becomes noticeable. In the case of calcium chloride, the meat will tolerate larger quantities of the calcium salt and its desirable effects can be obtained without the necessity of increasing the salty taste if the quantity of sodium chloride normally used in the pickling solution or curing mixture is proportionately reduced. The preferable quantity of soluble calcium salt ranges from 0.03 to 0.05 mole per kilogram of meat.

Soluble edible calcium salts suitable for use in practicing the invention include calcium chloride, calcium ascorbate, calcium acetate, calcium lactate, monocalcium orthophosphate $[Ca(H_2PO_4)_2]$, and calcium cyclamate.

In some curing solutions phosphate or citrate salts are used in addition to the nitric oxide producing salts such as sodium nitrate and sodium nitrite. It is essential in practicing the present invention that such phosphate or citrate salts be eliminated from the curing solution if the desirable improvement in color and other advantages in the calcium ions are to be achieved. The phosphates and citrates will form complex ions to sequester the calcium and, consequently, the calcium ion is rendered useless to accomplish its results.

In accordance with our invention calcium ions are exchanged with hydrogen ions in the protein chains forming free acids with the acid residues of the corresponding calcium salts. This lowers the pH of the product. It is also suspected that the calcium ions depress the tissue respirations, thus creating better reducing conditions for the curing reactions. The reaction decreases hydration of meat proteins, thus increasing the amount of free moisture in the meat, which promotes dissolution and penetration of the cure into the meat substance. This is particularly important in the case of meat products cured by the dry curing technique. Dry sausages are processed in this way, and in this instance the lowering of the protein hydration increases the rate of drying the product to achieve the desired texture and hardness, thus shortening the processing time.

The intensity of cured meat color, formed in the presence of calcium ions, is comparable to the color intensity of heat-denatured nitric oxide myoglobin, the myochromogen. It indicates that calcium ions may affect denaturation of nitric oxide myochromogen comparable to heat denaturation.

It is also known that calcium ions stimulate growth of microorganisms, which in the case of dry sausage are taking part in the curing process and in the formation of desirable flavor.

It is apparent from experiments which we have conducted that a mere change in pH of the meat product is not sufficient to impart the improved characteristics. The addition of hydrochloric acid in an amount sufficient to change the pH to the same extent as the addition of calcium ions indicates that soluble calcium salts which release free calcium ions are mainly responsible for color and other improvements. Insoluble calcium salts, such as calcium carbonate, did not shown any color improvement, and it was also determined that when soluble calcium salts are eliminated by complex formation with ammonium oxalate that the desired color is not developed. Consequently, it is the calcium ions which have a specific effect on the formation of cured meat color, and other qualities.

The quality improvement in meat products resulting from the present invention may be obtained with cooked or uncooked, cured meat products. Various dry sausages, which usually are not cooked, develop the characteristic cured meat color in the presence of curing agents within a much shorter period of time than under conventional processing. The addition of 0.3 to 0.5% calcium chloride based on the weight of the meat prdouct will product a cured meat color at a temperature close to the freezing point of water, say 35° to 50° F., within one to two days after storage or processing. The color of the cured product is more uniform than in those cases where the color is developed by heating at elevated temperatures. Cured meat products which are processed at a low temperature for a long period of time, such as dry sausages, usually develop a gray-green surface discoloration under the casing. Addition of calcium salts to the sausage emulsion in accordance with this invention substantially eliminates this surface discoloration. Conseuently, the shelf life of such meat products is greatly prolonged. By vacuum packing, the cured color can be maintained for long periods of time.

An additional advantage resulting from the addition of calcium to the meat product is in its nutritional value. The calcium addition brings the quantity into the range found in cheese (0.1 to 1.0%). Calcium is normally present in meat to the extent from 0.006 to 0.01%.

To illustrate in invention, the following examples are cited:

EXAMPLE I

A Genoa salami sausage mix, consisting of comminuted pork, curing ingredients including sodium chloride, sodium nitrite and sodium nitrate, and spices, was stuffed into the casing. A second portion of sausage taken from the same lot was treated in accordance with the invention by adding 0.5% calcium chloride ($CaCl_2 \cdot 2H_2O$) based on the total weight of the meat. The salt was mixed with the curing ingredients prior to mixing with the meat. The stuffed sausage samples were aged for 64 days at 40°–50° F. The control samples, which did not contain calcium chloride, were not as firm, the red color was not uniform and there was slight surface discoloration grayish-green in color, not present in the sausage containing calcium chloride. The yield of the sausage processed in accordance with the invention was also superior by 2.5 volume percent. In other words, there was less shrinkage during aging.

EXAMPLE II

A batch of Genoa dry sausage (pork and beef) was prepared containing the conventional curing ingredients and spices set forth in Example I. To test samples of sausage from this batch 0.3% of calcium chloride on the basis of the weight of meat treated was added as part of the curing ingredients. Control samples of the sausage were prepared from the same batch using the identical conventional curing ingredients without calcium chloride. Both groups of samples were dried for 204 days at the conevntional dry sausage drying conditions.

An examination of the test samples after this period indicated that there was no surface discoloration of the sausage and the internal color and firmness of that sausage (as measured by a pressure gauge device) was much superior to the control samples. The flavor and appearance of the two sausages were determined by two test panels, with the results set forth in the following table:

*Table 1*

IMPROVEMENT OF CONSUMER QUALITIES OF GENOA SAUSAGE BY ADDING 0.3% CALCIUM CHLORIDE TO THE SAUSAGE FORMULA

| Quality Factor | Laboratory Taste Panel | | Dry Sausage Committee Taste Panel | |
|---|---|---|---|---|
| | Control | Test | Control | Test |
| Appearance | 3.5 | 4.2 | 3.8 | 4.6 |
| Flavor | 3.5 | 4.4 | 4.0 | 4.4 |

Numerical score system used: 5.0, perfect; 4.5 excellent; 4.0, very good; 3.5 good; 3.0 moderately good; 2.5 fair; 2.0 poor; 1.0 awful.

EXAMPLE III

Salami sausage consisting of beef and pork, curing ingredients and spices was processed using 0.3% calcium chloride, based on the meat weight, added to the curing and spice mixture prior to mixing with the comminuted meat. A control sample without the calcium chloride was also prepared. The products were smoked at 100°–130° F. for two days and then aged for 136 days at 40°–60° F. The finished products were exposed to room temperature and light. After eight days' exposure, cut surfaces of the control samples turned dark brown with an extreme gray ring on the surface adhering to the casing. The samples containing the calcium chloride showed a fine red color, characteristic of the process, throughout the entire cut surface with no ring discoloration evident on the casing side. It indicates that calcium chloride increases the shelf life of the product and prevents product discoloration under unfavorable storage conditions.

EXAMPLE IV

A Farmer dry sausage meat, consisting of ground beef, pork, salt, curing ingredients and spices, was stuffed after 24 hours' curing at 34°–36° F. into artificial casings, the stuffed sausages were smoked for one day at 80°–150° F. and then dried for 160 days at 40°–60° F. The test portion of the sausage contained 0.3% calcium chloride, based on the meat weight, which was added to the sausage emulsion along with the curing ingredients and salt.

The finished products were analyzed organoleptically for flavor, color and texture. It was found that the test sausage containing the calcium chloride had a better pronounced spice flavor and slightly better texture and flavor. However, the greatest effect of calcium chloride addition was expressed in the external appearance of the product. The normally processed sausage was, as usual, covered with gray deposit of dried-out molds, while the test sausage, with calcium chloride, was free of mold surface coverage. The mold growth inhibitory effect of calcium chloride was shown also on the sausage emulsion. By keeping the normal sausage emulsion in an open container in a cold room with high humidity, the surface of the emulsion was covered with mold (mostly green penicillium) within four to six days' storage, while the test emulsion, containing 0.3% calcium chloride, stored under the same conditions, was free of mold.

EXAMPLE V

A test was made to determine the effect of calcium ions on the formation of cured meat color during 24 hours' storage at 40° F. Samples of Genoa and salami sausage meats, containing salt, curing ingredients and spices, were taken from the production line at the time of stuffing. The meats were thoroughly mixed with 0.5% calcium chloride and 4% ice water, based on the meat weight. The calcium salt was previously dissolved in water to provide uniform distribution of calcium ions throughout the meat. The control samples were mixed with 4% ice water alone.

To investigate the effect of calcium ions on the color formation of cured hams, a whole ham, pumped and cured in the plant in the conventional way, was trimmed, defatted and the lean portion ground through a ⅛ inch plate. The ground ham was then mixed with 0.5% calcium chloride plus 4% water (test), or with only 4% water (control) as in the case of the salami and Genoa meats.

After storing the samples 24 hours at 40° F. the following observations were made with respect to cured color:

*Table 2*

EFFECT OF CALCIUM CHLORIDE ON THE FORMATION OF CURED MEAT COLOR DURING 24 HOUR STORAGE OF MEATS AT 40° F.

| Meat Sample | Visual Color Observation after 24 Hrs. Storage | | |
|---|---|---|---|
| | Genoa | Salami | Cured Ham |
| Control | Gray | Brown-Gray | Slightly Pink. |
| Test | Pink | Red | Very Pink. |

EXAMPLE VI

A test was made to determine the effect of calcium chloride on the formation of cured meat color over a range of heating temperatures. Genoa and salami sausages and cured ham were prepared with and without calcium chloride, as described under Example V. The samples were heated for 30 minutes in test tubes of the type used for shrinkage determination. Visual observation of the samples after heating at temperatures from 100°–160° F. are set forth below:

*Table 3*

EFFECT OF CALCIUM CHLORIDE ON THE FORMATION OF CURED MEAT COLOR AT DIFFERENT HEATING TEMPERATURES [1]

| Heating Temperature, ° F. | Color Intensity—Visual Observation | | | | | |
|---|---|---|---|---|---|---|
| | Genoa | | Salami | | Cured Ham | |
| | Control | Test | Control | Test | Control | Test |
| 100 | [2]0 | [2]1 | 0 | 1 | 0 | 1 |
| 120 | 0 | 2 | 0 | 2 | 0 | 2 |
| 130 | 0 | 3 | | | | |
| 140 | 2 | 3 | 1 | 3 | 2 | 3 |
| 160 | 3 | 3 | 2 | 3 | 3 | 3 |

[1] The heating was done for 30 minutes in the test tubes used for shrinkage determination. (E. Wierbicki, L. E. Kunkle and F. E. Deatherage, Food Technology II, No. 2, 69–73 (1957).
[2] Zero (0)=No cured pink color. Number (1)=Cured pink color intensity of meat sample containing CaCl₂, heated to 100° F. Size of number indicates the estimated relative intensity of the color.

It will be noted from Table 3 that there is no color developed in the control samples below 130° F. At 140° color is first observed. In all instances where calcium chloride has been added to the meat, the pink cured meat color was already present in the unheated meat samples (see Table 2).

EXAMPLE VII

Table 4 illustrates the addition of calcium chloride, calcium acetate and calcium ascorbate in various quantities to different kinds of meat and its effect on the pH of the meat after different lengths of time. The samples were prepared in accordance with Example V. In all instances, addition of calcium salts shifted slightly the pH of the meat to the acid side, thus providing more favorable conditions for the cured color formation.

*Table 4*

EFFECT OF SOLUBLE CALCIUM SALTS ON THE pH OF VARIOUS CURED MEATS

| Sample No. | Kind of Meat | Ca Salt Used | Amount Ca Salt Added, Percent [1] | Days After Ca Salt Addition | pH | |
|---|---|---|---|---|---|---|
| | | | | | Test | Control |
| 1 | Cured Ham | CaCl₂ | 0.5 | 1 | 5.58 | 5.83 |
| 2 | Pork Cured Shoulder | CaCl₂ | 0.5 | 1 | 5.69 | 6.14 |
| 3 | Salami | CaCl₂ | 0.5 | 1 | 5.54 | 5.88 |
| | do | CaCl₂ | 0.5 | [2]38 | 5.30 | 5.36 |
| | Genoa | CaCl₂ | [3]0.55 | 3 | 5.70 | 6.13 |
| | do | Calcium Acetate | [3]0.79 | 3 | 5.80 | 6.13 |
| 4 | do | Calcium Ascorbate | [4]0.98 | 3 | 6.17 | [5]6.22 |
| | do | CaCl₂ | 0.5 | 1 | 5.58 | 6.07 |
| | do | CaCl₂ | 0.5 | 15 | 5.45 | 5.85 |
| 5 | do | CaCl₂ | 0.5 | 29 | 5.40 | 5.79 |
| | do | CaCl₂ | 0.5 | 48 | 5.35 | 5.70 |
| | do | CaCl₂ | 0.5 | [2]65 | 5.37 | 5.71 |

[1] By weight.
[2] Finished products.
[3] 0.05 mole of the salt added per 1000 g. meat.
[4] 0.025 mole added per 1000 g. meat.
[5] Equivalent amount of sodium ascorbate added to the control Genoa meat.

All meat samples containing calcium salts showed better developed meat color. Calcium ascorbate differs from other calcium salts in its action on non-cooked cured meat color formation. Within the first 1–3 days after the addition to the meat containing curing ingredients calcium ascorbate accelerates the formation of the cured meat color. However, after 3 days the fading of the cured meat color occurs. Consequently, calcium ascorbate can be used for accelerating cured meat color formation in meats which after 1–3 days curing are fully cooked.

EXAMPLE VIII

Calcium acetate was substituted for calcium chloride in Example II. The test and control samples were examined after 60 days' aging (not 204 days as in Example II). The test sample was much superior in color to that of the control sample.

EXAMPLE IX

A batch of Genoa dry sausage consisting of pork and beef, sodium nitrite, sodium nitrate, spices and sodium chloride was divided into two portions. To one portion was added 0.3% calcium lactate while nothing was added to the other portion. Both portions were thoroughly comminuted and mixed, and then stuffed into casings. The color formation was comparable to that obtained by adding the same quantity of calcium chloride as in Example I. The lactate salt also replaces sugar, conventionally added to dry sausage to increase the lactic acid content by metabolism with harmless bacteria. The lactic acid lowers the pH of hot meat from 7.2 to 5.5–5.8 during meat chilling, thus promoting the formation of nitric oxide myoglobin.

EXAMPLE X

The effect of calcium cyclamate was tested on a laboratory scale by adding 0.5 weight percent to Genoa meat prepared according to standard formulation and containing sodium nitrate and sodium nitrite curing ingredients. As compared to an identical sample without the calcium cyclamate, the intensity of the cured meat color was much superior after 30 minutes' heating at 100° F. The addition of sodium cyclamate in place of calcium cyclamate produced the same results as the control sample without any cyclamate salt.

Various modifications of the method of treatment will be apparent to those skilled in the art without departing from the spirit of the invention. It is, therefore, not our intention to limit the invention otherwise than as necessitated by the scope of the appended claims.

What we claim as new and desire to secure by Letters Patent of the United States is:

1. A method for rapidly curing comminuted meat which comprises uniformly admixing therewith a curing agent containing sodium nitrate, sodium nitrite and a soluble edible calcium salt, said salt being present in an amount ranging from 0.02 to 0.06 mole per kilogram of meat to provide free calcium ions for reaction with the meat protein, and aging said mixture at a temperature 35° to 50° F. for at least 24 hours.

2. A method for rapidly curing comminuted meat which comprises uniformly admixing therewith an aqueous pickling solution containing sodium nitrate, sodium nitrite and from 0.03 to 0.05 mole of calcium chloride per kilogram of meat to provide free calcium ions for reaction with the meat protein, and aging said mixture at 35° to 50° F. for at least 24 hours.

3. A method for preventing surface discoloration of dry sausage and improving the cured color thereof which comprises intimately admixing with comminuted sausage meat a curing mixture containing a nitric oxide forming curing agent and about 0.3 to 0.5% calcium chloride based on the meat weight to provide free calcium ions for reaction with the meat protein.

4. A method for accelerating the formation of nitric oxide myoglobin in cured meat products which comprises adding to comminuted meat to be cured sodium nitrate, sodium nitrite and a source of soluble edible calcium ions in an amount ranging from 0.1 to 1% calcium by weight based on the weight of the meat to provide free calcium ions for reaction with the meat protein, and aging the meat at a temperature between 35° and 120° F. to form nitric oxide myoglobin.

References Cited in the file of this patent

UNITED STATES PATENTS

| 180,627 | Parent | Aug. 1, 1876 |
| 1,635,302 | Alsberg | July 12, 1927 |
| 1,998,179 | Wolf | Apr. 16, 1935 |
| 2,084,864 | Paddock | June 22, 1937 |
| 2,681,287 | Starr | June 15, 1954 |
| 2,761,783 | Ferguson | Sept. 4, 1956 |
| 2,946,692 | Kahn et al. | July 26, 1960 |